United States Patent
Buchholz

(10) Patent No.: US 9,609,942 B2
(45) Date of Patent: Apr. 4, 2017

(54) METHOD FOR MAKING A TOOTHBRUSH

(71) Applicant: M+C Schiffer GmbH, Neustadt/Wied (DE)

(72) Inventor: Erwin Buchholz, Asbach (DE)

(73) Assignee: M+C SCHIFFER GMBH, Neustadt/Wied (DE)

( * ) Notice: Subject to any disclaimer, the term of this patent is extended or adjusted under 35 U.S.C. 154(b) by 496 days.

(21) Appl. No.: 14/039,858

(22) Filed: Sep. 27, 2013

(65) Prior Publication Data
US 2015/0089758 A1    Apr. 2, 2015

(51) Int. Cl.
| | |
|---|---|
| *A46D 3/00* | (2006.01) |
| *A46B 9/04* | (2006.01) |
| *B29C 45/16* | (2006.01) |
| *A46B 5/00* | (2006.01) |
| *B29C 45/00* | (2006.01) |
| *B29L 31/42* | (2006.01) |

(52) U.S. Cl.
CPC ............ *A46D 3/005* (2013.01); *A46B 5/0029* (2013.01); *A46B 9/04* (2013.01); *B29C 45/1657* (2013.01); *B29C 45/1676* (2013.01); *B29C 45/0081* (2013.01); *B29C 45/1639* (2013.01); *B29C 2045/1659* (2013.01); *B29L 2031/425* (2013.01)

(58) Field of Classification Search
CPC .................. A46D 3/005; A46B 5/0029; A46B 2200/1066; A46B 9/04; B29C 45/1657; B29C 45/1639; B29C 45/1635; B29C 2045/1659; B29C 45/0081; B29C 45/1676; B29L 2031/425
See application file for complete search history.

(56) References Cited

U.S. PATENT DOCUMENTS

| | | | |
|---|---|---|---|
| 6,066,282 A * | 5/2000 | Kramer | A46D 3/00 |
| | | | 15/167.1 |
| 6,276,020 B1 * | 8/2001 | Leversby | A46B 5/02 |
| | | | 15/143.1 |
| 7,047,591 B2 | 5/2006 | Hohlbein | |
| 7,908,699 B2 | 3/2011 | Hohlbein et al. | |

(Continued)

FOREIGN PATENT DOCUMENTS

| | | | | |
|---|---|---|---|---|
| DE | WO 2006002804 A1 * | 1/2006 | ......... | B29C 45/1635 |
| GB | WO 9738840 A1 * | 10/1997 | ......... | B29C 45/1635 |

(Continued)

*Primary Examiner* — Alison L Hindenlang
*Assistant Examiner* — Jerzi H Moreno Hernandez
(74) *Attorney, Agent, or Firm* — The Webb Law Firm

(57) ABSTRACT

A method for making a toothbrush including a handle, a head including at least one cleaning element extending therefrom, and a hinge arranged between the head and the handle, said hinge including a joint between the handle and the head of a harder thermoplastic component covered by a softer thermoplastic component is provided, the method including: forming a base body by injection molding of a first thermoplastic material forming one of the handle or the head, and injection molding of a second thermoplastic material for forming the other of the handle or the head to thereby fuse the second thermoplastic material against the first thermoplastic material; placing the base body into a further mold; and injection molding the softer thermoplastic component for covering the joint.

10 Claims, 6 Drawing Sheets

(56) References Cited

U.S. PATENT DOCUMENTS

| | | | |
|---|---|---|---|
| 2001/0013152 A1* | 8/2001 | Meyer | A46D 3/005 15/193 |
| 2003/0070259 A1* | 4/2003 | Brown | A46B 5/02 16/436 |
| 2004/0010876 A1* | 1/2004 | Kraemer | B29C 45/1671 15/143.1 |
| 2008/0315668 A1* | 12/2008 | Huber | B29C 45/0062 300/21 |
| 2010/0101037 A1* | 4/2010 | Gross | A46B 5/02 15/167.1 |
| 2011/0146015 A1* | 6/2011 | Moskovich | A46B 5/02 15/167.1 |
| 2014/0082871 A1* | 3/2014 | Su | A46B 3/00 15/167.1 |
| 2014/0173853 A1* | 6/2014 | Kirchhofer | B29C 45/1642 16/430 |

FOREIGN PATENT DOCUMENTS

| | | | |
|---|---|---|---|
| JP | 10179258 A | * | 7/1998 |
| WO | 9738840 A1 | | 10/1997 |

* cited by examiner

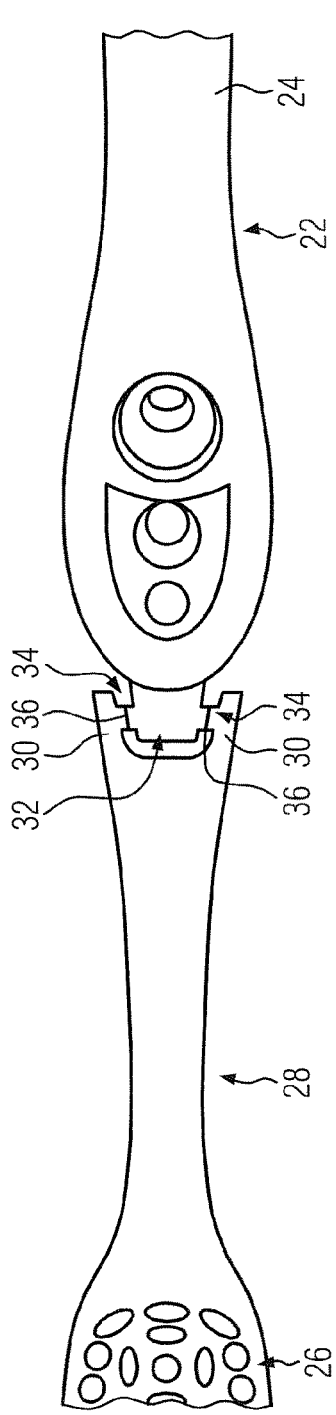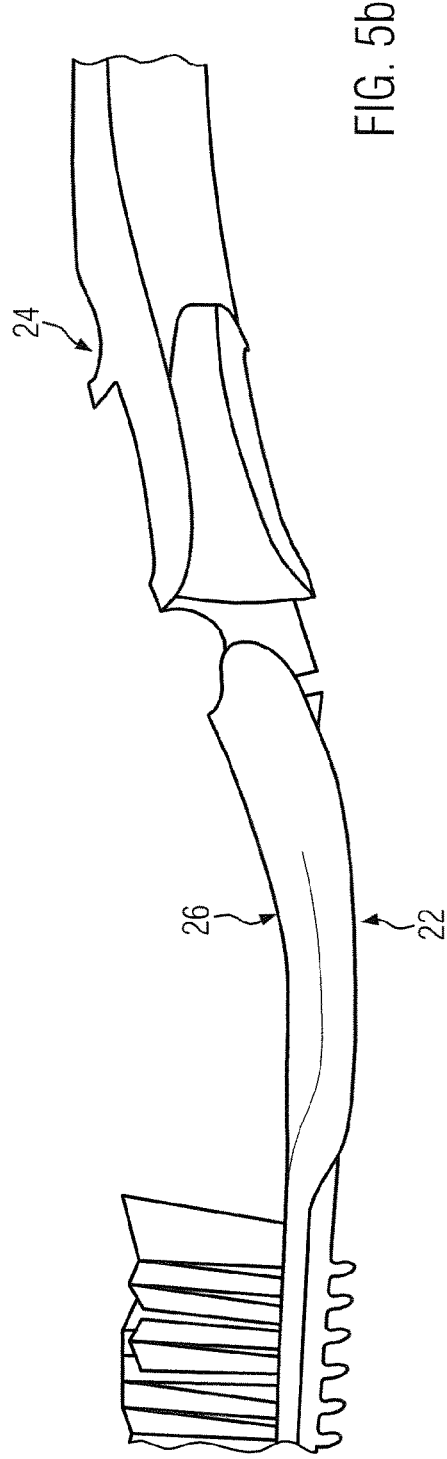

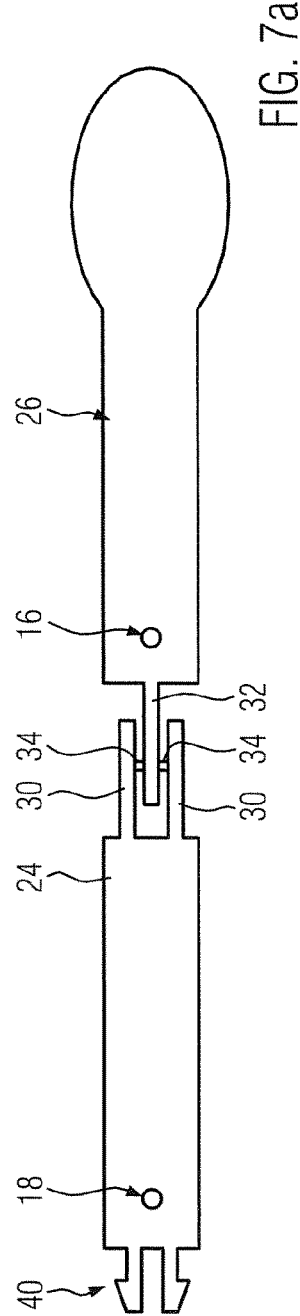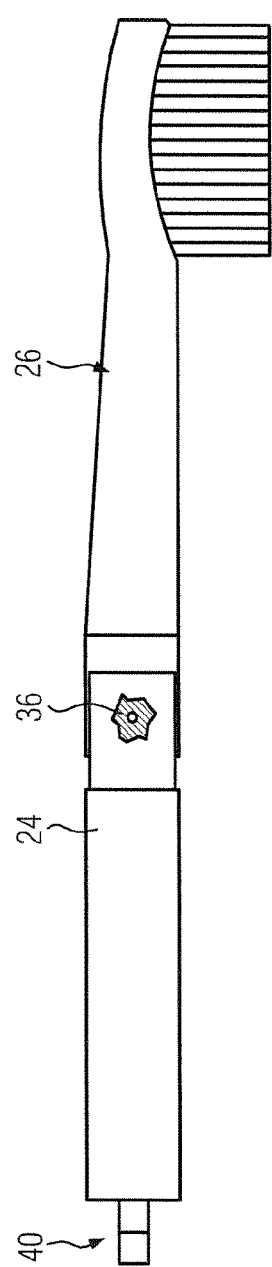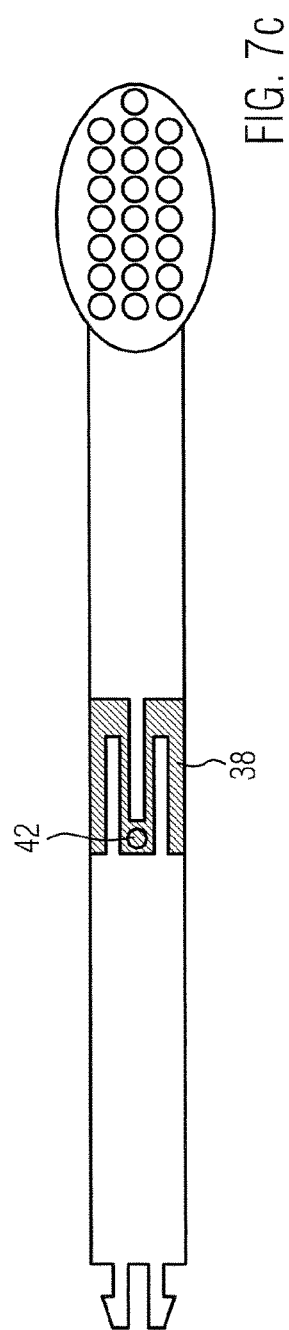

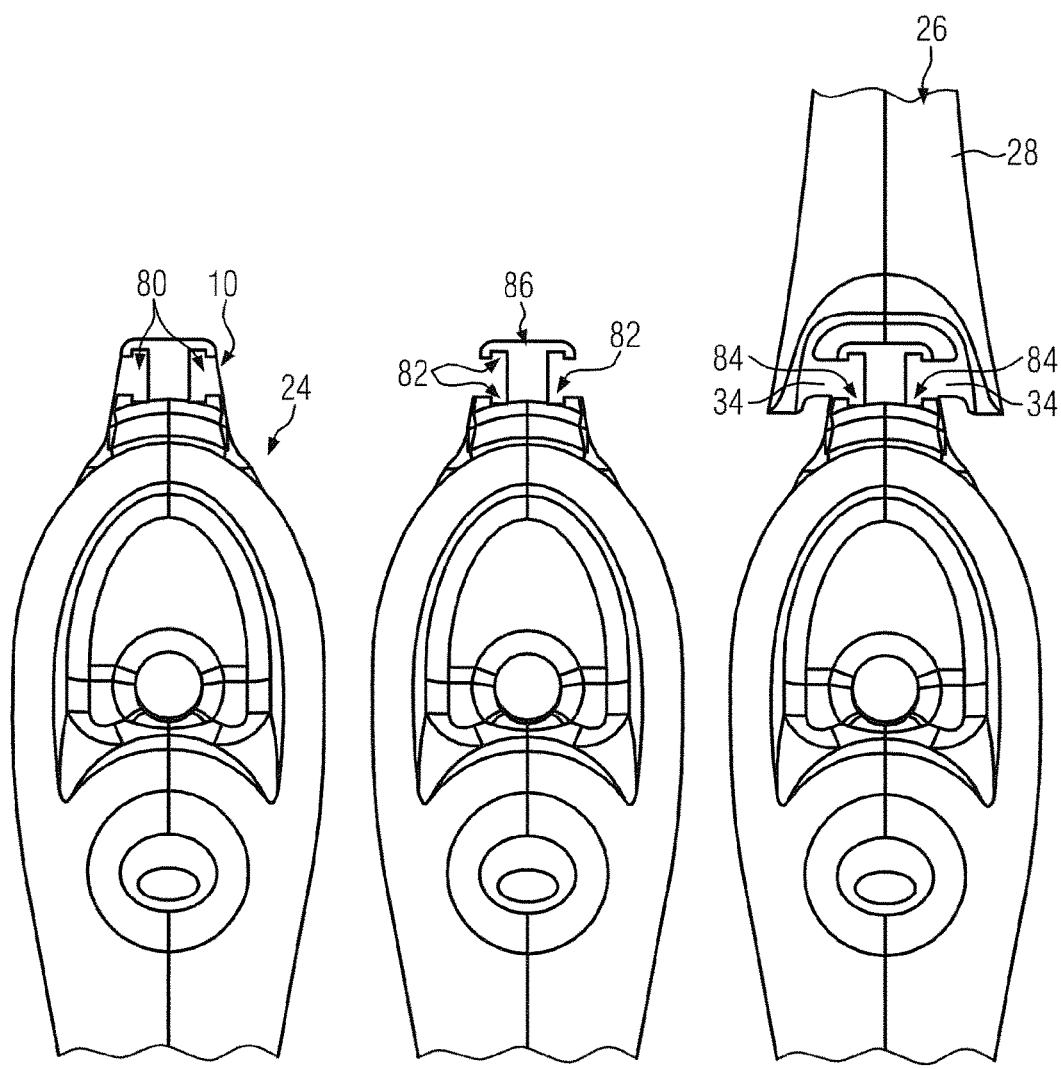

METHOD FOR MAKING A TOOTHBRUSH

BACKGROUND OF THE INVENTION

Field of the Invention

The present invention relates to a method for making a toothbrush.

Description of Related Art

A toothbrush usually has a handle and a head. The head comprises at least one cleaning element extending therefrom. A cleaning element in the meaning of the present invention can be a single bristle, a bristle bundle, i.e,. a bristle tuft or an elastomeric cleaning element. Said cleaning element is projecting a first, i.e., front face of the head of the toothbrush for cooperating with the teeth to be cleaned in a conventional manner. The toothbrush generally comprises other cleaning elements including cleaning elements for cleansing soft tissue in the mouth, e.g., as known from U.S. Pat. No. 7,908,699 B2. Such cleansing elements are generally provided on the back face of the brush head, i.e., the face which is essentially parallel to the first face and opposite thereto. Such cleansing elements are usually provided for removal of microbial debris from the soft tissue, which soft tissue in particular is the tongue of the user of the toothbrush. In the course of the cleaning action, excessive pressure on the toothbrush and in particular the gums is to be avoided. Thus, it is generally known in the art of toothbrush making to provide a hinge between the handle and the head of the toothbrush. Thus, the head has the ability to flex in response to excessive forces between the at least one cleaning element and the teeth, in particular the gum surrounding said teeth.

It is known in the art to make the toothbrush with a base body of a first thermoplastic material, which usually is a hard component thermoplastic material. In order to provide the hinge, the base body can have a reduced thickness, i.e., cross-section in the area of the hinge and a geometry adopted to allow the head to flex relative to the handle. The constitution is such that flexing is in particular feasible about an axis extending perpendicular to the longitudinal extension of the toothbrush and essentially parallel to the first, i.e., front face of the brush head.

In order to avoid bacteria and dirt collecting in the area in which the base body has a reduced cross-section, the harder thermoplastic component of the base body is covered by a softer component, which usually is a thermoplastic component, in particular a thermoplastic elastomer. The softer thermoplastic component is usually applied by injection molding around the base body. Apart from covering the harder thermoplastic component in the area of the hinge, the softer thermoplastic component can likewise be provided for improving the haptic properties of the handle, e.g., as known from U.S. Pat. No. 7,047,591 B2.

In the generally known manufacturing process for making such toothbrush, the base body is generally made by injection molding a first, harder thermoplastic material into a first mold. After solidification, the base body is demolded and transferred to a second mold, which is slightly larger than the first mold, i.e., the mold for making the base body. The voids between the second mold and the base body are then filled by injection molding the softer thermoplastic component into the second mold to provide a thermoplastic covering and/or thermoplastic sleeves or coatings, cushion or the like by injection molding around the base body. Then, the toothbrush body is demolded. The toothbrush body can, for example, be injection molded around by at least one further component which can be a harder component or a softer component.

While the above manufacturing process is well adopted and used in the art, there is need for a further improvement of the known method. Thus, it is one object of the present invention to propose a method which is capable of allowing making a toothbrush, which toothbrush has a base body specifically adopted to cope with different needs to fulfill for making the handle on the one hand, and the head on the other hand, and to provide a method for making a toothbrush suitable to more economically manufacture the toothbrush.

BRIEF SUMMARY OF THE INVENTION

In some non-limiting embodiments, there is provided a method for making a toothbrush comprising a handle, a head comprising at least one cleaning element extending therefrom, and a hinge arranged between the head and the handle, said hinge comprising a joint between the handle and the head of a harder thermoplastic component covered by a softer thermoplastic component, said method comprising: forming a base body by injection molding of a first thermoplastic material forming one of the handle or the head, and injection molding of a second thermoplastic material for forming the other of the handle or the head to thereby fuse the second thermoplastic material against the first thermoplastic material; placing the base body into a further mold; and injection molding the softer thermoplastic component for covering the joint.

In some non-limiting embodiments, there is provided a method for making a toothbrush comprising a handle, a head comprising at least one cleaning element extending therefrom, and a hinge arranged between the head and the handle, said hinge comprising a joint between the handle and the head of a harder thermoplastic component covered by a softer thermoplastic component, said method comprising: forming a base body in a first mold, which is dividable by a movable gate, wherein a first thermoplastic material is injection molded into a portion of the first mold closed by the movable gate and wherein the movable gate is opened after injection molding of a predetermined volume of the first thermoplastic material into the first mold, corresponding essentially to the volume of the first thermoplastic material of the final product, and wherein the second thermoplastic material is injection molded into the first mold after the gate has been opened.

In some non-limiting embodiments, there is provided a method for making a toothbrush comprising a handle, a head comprising at least one cleaning element extending therefrom, and a hinge arranged between the head and the handle, said hinge comprising a joint between the handle and the head of a harder thermoplastic component covered by a softer thermoplastic component, said method comprising: forming a base a body in a first mold which is dividable by a movable gate, wherein the movable gate is adapted to provide formfit forming surfaces, wherein the first thermoplastic material is formed against the movable gate to provide formfit surfaces formed by the formfit forming surfaces of the movable gate and wherein the second thermoplastic material is injection molded against the formfit surfaces thereby providing formfit counter surfaces to connect the handle with the head in a positive fit.

BRIEF DESCRIPTION OF THE DRAWINGS

A more complete understanding of the present invention and advantages thereof may be acquired by referring to the following description in consideration of the accompanying drawings, in which like reference numbers indicate like features, and wherein:

FIG. 5a is a top view of the middle section of a toothbrush manufactured according to the present invention;

FIG. 5b is a side view of the middle section of a toothbrush manufactured according to the present invention;

FIG. 7a is a top view of a base body of a second embodiment of a toothbrush manufactured according to the present invention;

FIG. 7b is a side view of the base body shown in FIG. 7a;

FIG. 7c is the embodiment of FIG. 7a, 7b after injection molding around of the softer elastomeric material;

FIG. 8a is a top view of a section of the base body corresponding to the handle for a third embodiment of the present invention;

FIG. 8b is the embodiment of FIG. 8a after removing the movable gate; and

FIG. 8c is the view in accordance with FIG. 8a or 8b after the second thermoplastic material has been injection molded.

DETAILED DESCRIPTION

Figure 1:
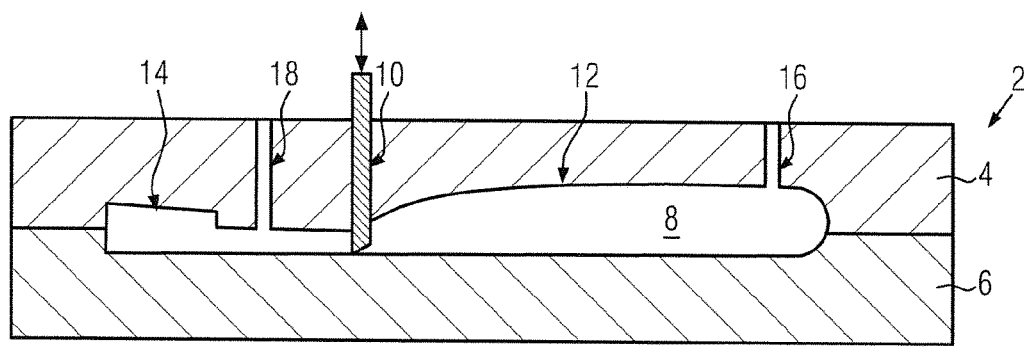
FIG. 1 is a longitudinal cross-sectional view of a first mold, in which the movable gate is closed.

For the purposes of this specification, unless otherwise indicated, all numbers expressing physical characteristics, and so forth used in the specification and claims are to be understood as being modified in all instances by the term "about."

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

In some non-limiting embodiments, the present invention provides a method for making a toothbrush in which a base body is formed by injection molding of a first thermoplastic material. This first thermoplastic material is injection molded into the cavity of the injection mold that will fill only a portion of said mold cavity. Respective portion essentially corresponds to that portion of the mold cavity adopted to mold either the handle or the head. In other words, the first thermoplastic material will be injection molded to either make the head or the handle. Then, a second thermoplastic material is injection molded into the cavity for forming the other of the handle or the head. The second thermoplastic material is injection molded into the mold cavity such that it contacts a free surface provided by the first thermoplastic material to thereby fuse the second thermoplastic material against the first thermoplastic material. When fusing the second thermoplastic material against the first thermoplastic material, the first thermoplastic material has not yet solidified. In fact, it is preferable to fuse the two thermoplastic materials against each other as the first thermoplastic material is still plastic and has solidified to a certain extent. As the melt provided by the second thermoplastic material contacts the free surface of the first thermoplastic material, this surface preferably has a temperature of between about 130° C. and about 160° C. corresponding to about 266° F. and about 320° F. As the second thermoplastic material is pressurized when being injected, the same deforms the free surface of the first thermoplastic material.

In the inventive method, the base body is provided by at least two different thermoplastic materials being fused against each other in a single mold and as the first thermoplastic material, which is injection molded into the mold cavity as the first component, has not yet fully solidified. The first thermoplastic material may have solidified adjacent to and in vicinity of the walls of the mold cavity. However, a core of the first thermoplastic material at the front surface has not solidified. Thus, as the melt front of the second thermoplastic material contacts the free surface of the first thermoplastic material, the same will yield due to the injection pressure of the second thermoplastic material and allow the second thermoplastic material to assume at least part of the volume previously captioned by the first thermoplastic material. In this course, the interface between the first thermoplastic material and the second thermoplastic material is enhanced which contributes to a thorough joint between the two materials. While each of the two materials preferably form one of the handle and the head, a minor amount of one thermoplastic material can likewise be present in the other part of the brush body. If the first thermoplastic material forms the handle, it can be present within the hinge or a portion of the head in close vicinity of the hinge. If the first thermoplastic material forms the head, respective material may likewise to a minor extent exist in the handle in close vicinity of the hinge. Accordingly, the first thermoplastic material may be provided on both sides of the hinge or the second thermoplastic material may be provided on both sides of the hinge. However, the major volume of the handle and the head, i.e., at least about 95% of said volume is provided by the thermoplastic material assigned to respective portion of the base body. Thus, in some non-limiting embodiments, the first and the second thermoplastic materials are injection molded in the same mold. In some non-limiting embodiments, the second thermoplastic material is injected after injecting a predetermined volume of the first thermoplastic material into a mold corresponding essentially to the volume of the first thermoplastic material of the final toothbrush.

After forming the base body, the same may be placed into a further mold and injection molded around by softer elastomeric material for covering the joint in a generally known method.

The at least one cleaning element may be provided after readily making a body of the toothbrush by injection molding of at least two thermoplastic materials.

It may, however, likewise be feasible to secure the cleaning elements in case the same are provided by bristle bundles or filaments by fusing the fastening end side of the bristle bundle/filament to thereby provide a thickening and to insert this fastening end side in the mold cavity. Generally, the bristle bundles are held by a so-called index plate generally provided with a plurality of channels, each channel holding a bristle filament or a bristle bundle in place as the material forming the head is injection molded into the cavity (in-mold technique).

The inventive method for making a toothbrush is capable of, e.g., making the head with a more expensive first thermoplastic material while the handle is made of a cheaper second thermoplastic material for reducing manufacturing costs.

As the brush head usually has a smaller thickness than the handle, the latter may be made of a thermoplastic material providing a high thermal conductivity to more effectively cool the second thermoplastic material than the first thermoplastic material. With such means, manufacturing cycle time may be reduced and, thus, productivity may be improved.

In general, the inventive method provides a possibility to make the base body in one piece and as single mold cavity utilizing different components and thereby to adapt the different components on the specific requirements and needs to be fulfilled for the head on the one hand and the handle on the other hand.

In some non-limiting embodiments of the present invention, the joint is made of the first thermoplastic material. In some non-limiting embodiments, the joint is made of the second thermoplastic material. Non-limiting examples of suitable thermoplastic materials include polypropylene (PP), polybutylene terephthalate (PBT), polyethylene terephthalate (PET), acrylonitrile butadiene styrene (ABS) polymers, and mixtures thereof. For example, in one embodiment, the first thermoplastic material can be polypropylene, and the second thermoplastic material can be polybutylene terephthalate. In another embodiment, the first thermoplastic material can be polybutylene terephthalate, and the second thermoplastic material can be polyethylene terephthalate. In another embodiment, the first thermoplastic material can be polypropylene, and the second thermoplastic material can be acrylonitrile butadiene styrene polymer.

In some non-limiting embodiments of the inventive method, the base body is formed in a first mold, which is dividable by a movable gate. This movable gate is arranged to seal a portion of the first mold into which the first thermoplastic material is injection molded. Thus, a predetermined volume of the first thermoplastic material is injection molded into the first mold to only fill a portion thereof. After that, the movable gate is opened. From another gate than the gate used for injection molding the first thermoplastic material, the second thermoplastic material is injected into the mold, i.e., the free volume remaining in the cavity after injection molding of the first thermoplastic material. This remaining volume has been closed off in the course of injection molding the first thermoplastic material by the movable mold. The second thermoplastic material is molded against the free surface of the first thermoplastic material, which free surface has become free when opening the movable gate. This free surface can be considered as a plug closing an end side of the usually longitudinal volume of the cavity capable of receiving the second thermoplastic material.

As the second thermoplastic material is molded against the free surface of the first thermoplastic material with a pressure, molding of the second thermoplastic material against the free surface may deform the free surface. Accordingly, the first thermoplastic material will be plastically deformed by the injection pressure of the second thermoplastic material. In the course of this deformation, the interface between the first and the second thermoplastic material will increase. The second thermoplastic material will be forced into the first thermoplastic material and thereby fused with the first thermoplastic material over a joining interface having a greater surface than the free surface existing as the movable gate is opened.

According to a further preferred embodiment, the movable gate is adapted to provide formfit forming surfaces. The first thermoplastic material is formed against the movable gate to thereby provide formfit surfaces on the portion of the base body made of the first thermoplastic material. Next, the movable gate is withdrawn, i.e., opened thereby exposing the formfit surfaces provided by the first component in the remaining cavity. As the second thermoplastic material is injection molded, the same is molded against the formfit surfaces thereby providing formfit counter surfaces. The handle and the head of the base body are thereby connected in a positive fit. Respective positive fit will provide a secure connection between the handle and the head irrespective of whether the first thermoplastic material is still plastic when injecting the second thermoplastic material. In other words, a sound connection between the handle and the head can be achieved even if the first thermoplastic material has completely solidified and hardened.

Referring now to the Figures, FIG. 1 shows a longitudinal cross-sectional view of a first mold comprising two mold elements 4, 6, which are movable relative to each other to enclose a cavity 8, which is dividable by movable gate 10 into a first portion 12 and a second portion 14. To each portion 12, 14 a gate 16, 18 is assigned leading to a sprue filled with liquid thermoplastic material of different constitution.

Figure 2:
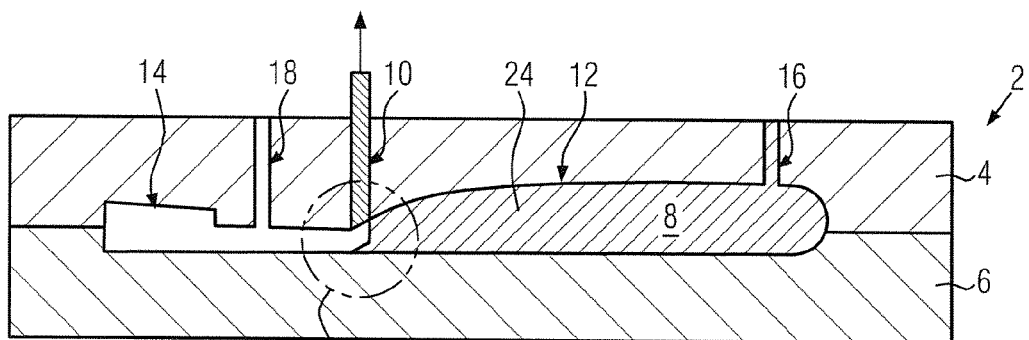
FIG. 2 is a longitudinal cross-sectional view of a first mold, in which the movable gate is open.
Figure 3:
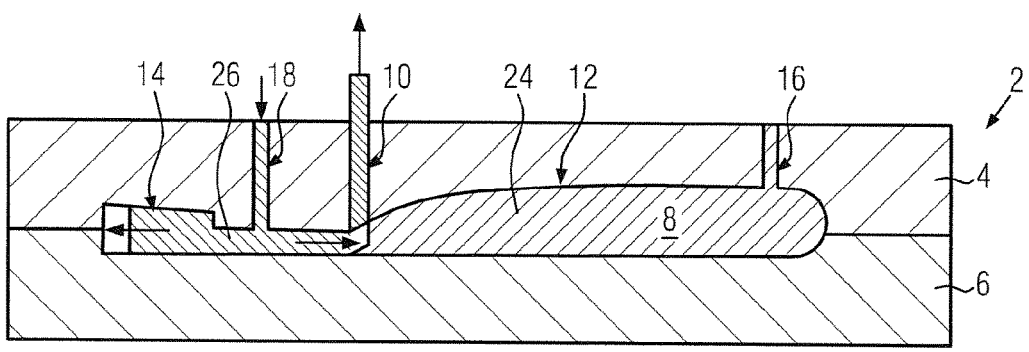
FIG. 3 is a longitudinal cross-sectional view of a first mold during injection molding of the second thermoplastic component.
Figure 4A:
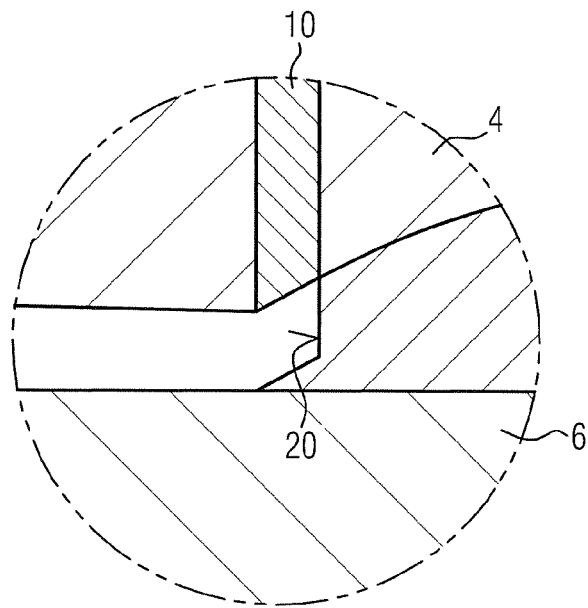
FIG. 4a is an enlarged view of detail D of FIG. 2.
Figure 4B:
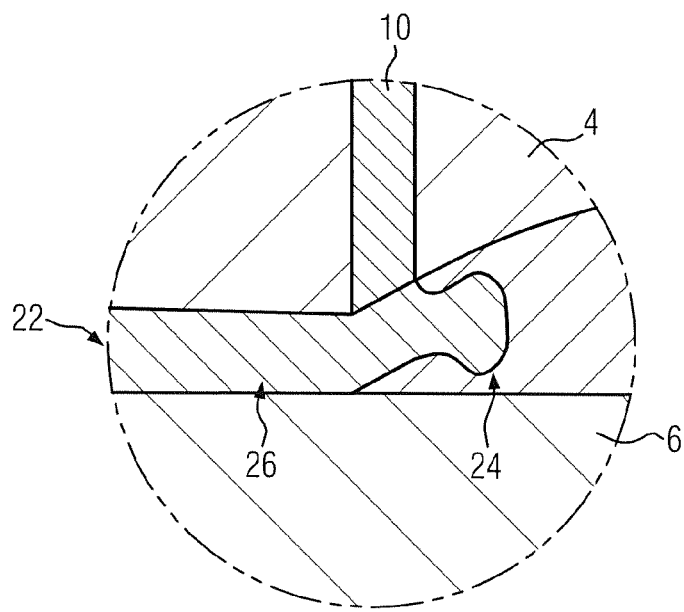
FIG. 4b is the detail of FIG. 4a after joining the first thermoplastic component with the second thermoplastic component.

Prior to injection molding, the first mold 2 is closed to thereby enclose the cavity 8. The movable gate 10 is likewise closed. In the example herein described, first thermoplastic material is injection molded through gate 16 to thereby form the portion 12 of the cavity 8 corresponding essentially to the handle of the toothbrush. The first thermoplastic material is allowed to cool and to assume the form of the portion of the cavity 8. Then, the movable gate 10 is opened (FIG. 2) thereby exposing a free surface 20 to a distal end of the second portion 14 of the cavity 8. The movable gate 10 is opened as the pressure or afterpressure for the first thermoplastic material is released. As the movable gate 10 is opened or immediately thereafter, a second thermoplastic material is injection molded into the second portion 14 of the cavity 8 through gate 18. Progressing in longitudinal direction of this second portion 14, the melt of the second thermoplastic material will eventually contact the free surface 20 (FIG. 3). As the second thermoplastic material is pressurized with a higher pressure than the first thermoplastic material, the free surface 20 is plastically deformed towards the first portion 12 of the cavity 8 (compare FIGS. 4a, 4b). As both thermoplastic materials have not yet solidified, fusing of the two thermoplastic materials will take place to thereby enhance a secure connection between the two portions of a base body 22, thus, comprising both, a handle 24 having a volume of the first thermoplastic material corresponding essentially to the first portion 12 and a head 26 having a volume corresponding essentially to the second portion 14 of the cavity 8. After fusing the two thermoplastic materials, afterpressure is applied to both sides of the free surface, i.e., on the first and the second thermoplastic material. The thermoplastic materials are thereby allowed to fully solidify by compensation of shrinkage on both sides of the free surface 20.

Then, the base body 22 is deformed and placed into another, slightly larger second mold (not shown) to overmold in particular a joint between the handle 24 and the head 26 providing a hinge between those two portions, which will be described hereinafter in greater detail.

FIGS. 5a and 5b depict an embodiment of a base body 22 formed in the aforementioned way with the head 26 including a neck 28. The proximal end of the head 26 has a Y-shaped configuration providing two arms 30 which encompass a boss 32 provided by the distal end of the handle 24. Between each arm 30 and the boss 32, a holding strip 34 extends in radial direction to thereby connect the head 26 with the handle 24. This holding strip 34 has a certain capability to yield a torsion thereby allowing bending of the head 26 relative to the handle 24 about an axis lying in the plane of drawing 5a and extending perpendicularly to the longitudinal axis of the base body 22 shown therein. As indicated schematically with line 36, the interface between the first and the second thermoplastic material is provided within the holding strip 34.

Figure 6A:
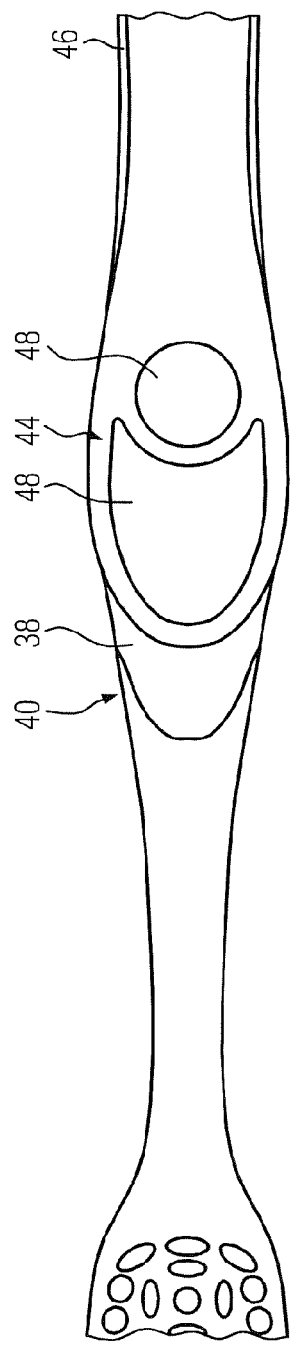
FIG. 6a is a top view in accordance with FIG. 5a for the final toothbrush.
Figure 6B:
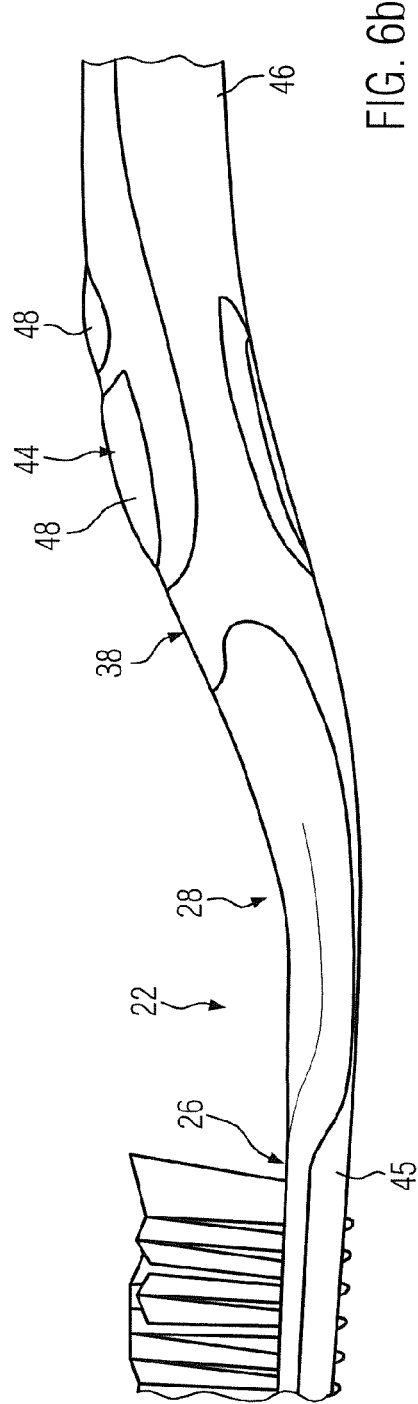
FIG. 6b is a side view in accordance with FIG. 5b for the final toothbrush.

FIGS. 6a and 6b show the toothbrush body after injection molding around of a softer thermoplastic component 38 rendering a smooth surface around a joint 40 provided by the holding strip 34. As evident from FIGS. 6a, 6b, the softer thermoplastic component 38 provides a smooth outer circumferential surface on the toothbrush body being free of voids or recesses, in which bacteria or dirt may be collected. As the softer thermoplastic component 38 has a shore hardness of between about 20 and about 80, which is by far more softer than the components used for making the base body 22, which components have a tensile modulus of elasticity according to DIN ISO 527-2 of between about 1000 and about 2000 MPa, the ability of the head 26 to flex relative to the handle 24 is not considerably impeded by the soft elastomeric covering of the joint 40.

FIGS. 7a to 7c show another non-limiting embodiment of a toothbrush manufactured according to the present invention. In comparison to the above description of the present embodiment, similar components are identified with identical reference numbers. As opposed to the first embodiment described, the interface between the two components used for making the base body 22 is provided in the arms 30 assigned to the handle 24 (FIG. 7b). The proximal end of the handle 24 is provided with snapping elements 40 adapted to mechanically lock to a drive drain of a powered toothbrush. Circles on the head 24 and the handle 26 denote the gate position of gates 16 and 18, respectively.

A respective circle in FIG. 7c denotes a gate 42 for the softer thermoplastic component adapted to cover the joint between the two sections of the base body 22.

As, e.g., derivable from FIGS. 6a and 6b, the brush body manufactured according to the present invention may be overmolded by a further, i.e,. second softer thermoplastic component to, e.g., provide a pad 44 for the thumb of the user. Further, the softer thermoplastic component of the hinge may likewise provide other functional elements on the base body 22 like an elastomeric coating 45 on the back surface of the head 26 and/or an elastomeric covering 46 on the backside of the handle 24 to improve haptic properties. The elastomeric covering 46 is utilized as a cleanser for removal of debris from soft tissue in the mouth and is likewise used as a gum protection.

Further, as evident from FIGS. 6a and 6b, the second or a further elastomeric material may be injection molded around the base body 22 to provide the pad 44 with one or more cushions 48 for, e.g., the thumb of the user.

FIGS. 8a through 8c are to elucidate a further embodiment, in which the movable gate 10 is adapted to provide formfit surfaces 82. Respective movable gate 10 is provided with two hammerhead-shaped projections 80, which protrude in the portion 12 of the cavity 8 for making the handle 24 and are adapted to opposing lateral side faces of the boss 32. Each of the hammerhead-shaped projections 80 of the movable gate 10 provides formfit forming surfaces adapted to define formfit surfaces 82 on the boss 32 of the handle 24, which formfit surfaces 82 are depicted in FIG. 8b. After complete or partial solidification, the movable gate 10 is retracted to thereby expose the formfit surfaces 82 formed by the first thermoplastic material. After that, the second thermoplastic material is injected into the cavity 8 to thereby form the head 26, which head 26 will be provided with formfit counter surfaces 84 cooperating with the formfit surfaces 82 of the handle 24 to thereby provide a positive fit between the handle 24 and the head 26. Due to this positive fit, a reliable connection is provided between the handle 24 and the head 26, which connection does not require joining of the two thermoplastic materials as the first thermoplastic material is still plastic and soft. In other words, the above described constitution with formfit surfaces 82 and formfit counter surfaces 84 will lead to reliable connection between the two components 24, 26 of the base body 22 even if the first thermoplastic material is allowed to completely solidify and cool before joining the second thermoplastic material against the first.

In the afore-discussed embodiment according to FIGS. 8a through 8c, the formfit surfaces 82 and formfit counter surfaces 84 are arranged such that axial displacements, i.e., displacement along the longitudinal axis of the toothbrush and the head 26 in a direction away from the handle 24 is prevented by the positive fit. Such movement is in particular prevented by a hammerhead front end 86 of the boss 32 of handle 24. Further, the hammerhead configuration of the projection 80 prevents dislocation of the holding strip 34 in radial direction as derivable from FIG. 8c.

The positive fit provided by the first and the second thermoplastic materials is further enhanced by injection molding around of the softer thermoplastic material 38.

LIST OF REFERENCE SIGNS 2 first mold
4 mold element
6 mold element
8 cavity
10 movable gate
12 first portion
14 second portion
16 gate
18 gate
20 free surface
22 base body
24 handle
26 head
28 neck
30 arm
32 boss
34 holding strip
36 separation line/interface
38 softer elastomeric material
40 joint/snapping element
42 gate
44 pad
45 elastomeric coating
46 elastomeric covering
48 cushion
80 hammerhead-shaped projection
82 formfit surface 84 formfit counter surface
86 hammerhead end of boss 32

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

The invention claimed is:

1. A method for making a toothbrush comprising a handle, a head comprising at least one cleaning element extending therefrom, and a hinge arranged between the head and the handle, said hinge being defined at a joint between the handle and the head and comprising an internal thermoplastic component covered by an external thermoplastic component, said method comprising:
   forming a base body by injection molding of a first thermoplastic material into a first mold forming one of the handle or the head, and injection molding of a second thermoplastic material into the first mold for forming the other of the handle or the head to thereby fuse the second thermoplastic material against the first thermoplastic material;
   placing the base body into a further mold; and
   injection molding the external thermoplastic component for covering the joint,
   wherein the first mold is dividable by a movable gate configured to separate the first mold into a first portion and a second portion corresponding essentially to volumes of the first thermoplastic material and the second thermoplastic material of a finished toothbrush, respectively,
   wherein the movable gate is disposed in the first mold at a position corresponding to the joint between the handle and the head of the toothbrush, and
   wherein the first thermoplastic material is injection molded into the first portion of the first mold closed by the movable gate and wherein the movable gate is opened after the injection molding of a predetermined volume of the first thermoplastic material into the first portion and before the second thermoplastic material is injection molded into the second portion of the first mold.

2. The method according to claim 1, wherein the joint is made of the first thermoplastic material.

3. The method according to claim 1, wherein the joint is made of the second thermoplastic material.

4. The method according to claim 1, wherein during the injection molding of the second thermoplastic material, the second thermoplastic material is fused against a surface provided by the first thermoplastic material having a temperature of between about 130° C. (266° F.) and about 160° C. (320° F.).

5. The method according to claim 1, wherein after injection molding of the second thermoplastic material, after-pressure is applied to the first and the second thermoplastic materials.

6. A method for making a toothbrush comprising a handle, a head comprising at least one cleaning element extending therefrom, and a hinge arranged between the head and the handle, said hinge being defined at a joint between the handle and the head and comprising an internal thermoplastic component covered by an external thermoplastic component, said method comprising:
   forming a base body in a first mold, which is dividable by a movable gate disposed in the first mold at a position corresponding to the joint between the handle and the head of the toothbrush, wherein a first thermoplastic material is injection molded into a portion of the first mold closed by the movable gate and wherein the movable gate is opened after injection molding of a predetermined volume of the first thermoplastic material into the first mold, corresponding essentially to the volume of the first thermoplastic material of the toothbrush, and wherein the second thermoplastic material is injection molded into the first mold after the gate has been opened.

7. The method according to claim 6, wherein after injection molding of the second thermoplastic material afterpressure is applied to the first and the second thermoplastic materials.

8. The method according to claim 6, wherein the first thermoplastic material is injected into the first mold for forming one of the handle or the head of the base body and wherein the second thermoplastic material is injection molded into the first mold to form the other of the handle or the head.

9. The method according to claim 8, wherein the second thermoplastic material is molded against a free surface of the first thermoplastic material with a pressure adapted to deform said free surface.

10. A method for making a toothbrush comprising a handle, a head comprising at least one cleaning element extending therefrom, and a hinge arranged between the head and the handle, said hinge being defined at a joint between the handle and the head and comprising an internal thermoplastic component covered by an external thermoplastic component, said method comprising:
   forming a base body in a first mold which is dividable by a movable gate disposed in the first mold at a position corresponding to the joint between the handle and the head of the toothbrush, wherein the movable gate is adapted to provide formfit forming surfaces, wherein the first thermoplastic material is formed against the movable gate to provide formfit surfaces formed by the formfit forming surfaces of the movable gate, and wherein the moveable gate is opened after the injection molding of a predetermined volume of the first thermoplastic material and before the second thermoplastic material is injection molded against the formfit surfaces thereby providing formfit counter surfaces to connect the handle with the head in a positive fit.

* * * * *